Patented Apr. 21, 1936

2,038,113

UNITED STATES PATENT OFFICE 2,038,113

MOLDING COMPOSITION

Kenneth M. Irey, Ridgefield Park, N. J., assignor to Resinox Corporation, New York, N. Y., a corporation of Delaware No Drawing. Application September 1, 1933, Serial No. 687,820

1 Claim. (Cl. 106—22)

The present invention relates to improvements in the production of plastics. More specifically, this invention relates to the production of phenolic condensation products containing large proportions of protein.

In the past, the cost of phenolic plastics has been excessive for many purposes due to the high proportion of pure resin in the final product which has been found to be necessary. For example, in making molding compositions it has been found that only about 50% of wood flour or other such material may be incorporated in the composition if good flow in the mold is to be obtained. Other materials have been tried in place of cellulosic fillers, but thermoplastic products in place of heat-hardened compositions have resulted, the products have not been water-resistant, they have not cured in the molds, or other difficulties have been encountered. Many attempts to avoid these difficulties have been made, but up to the present time all such efforts have met with failure.

However, I have now found that if the procedure of the present invention is followed, a large proportion of the expensive resin may be replaced by substantially pure proteins without detrimental effects, and in many cases with improved results. It is, of course, recognized that it has previously been attempted to utilize protein materials in compositions of this nature. However, these attempts have been directed toward reacting the protein material with the primary components of the resin, as in U. S. P. 965,137 by Goldsmith, or have succeeded in employing only a small proportion of protein material in conjunction with other materials such as hemicellulose, as in U. S. P. 1,135,340 by Weichmann.

According to the present invention, ratios of protein to resin as high as 3:1 may be employed with satisfactory results. When a lower ratio of protein to resin is maintained, a composition suitable for intricate molding is secured. However, when the higher ratios are employed, it has been found to be desirable to mold the material in sheets and machine the final products. In either case, the economic advantage of the substitution of such large amounts of cheap material for the more expensive resin is apparent.

The proteins such as gluten are admirably suited for use as fillers in certain types of molded products primarily because of their inherent plastic character. The ideal molding compound is one which has very good flowing qualities and a short curing time. Wood flour, one of the fillers most commonly used at the present time, while cheap, does not possess flowing qualities and hence a molding compound containing more than 55% wood flour as the filler is so stiff it cannot flow readily enough to make it suitable for many molding purposes. Since protein such as gluten flow readily at the elevated temperatures required for most molding operations the use of such materials as fillers in molding compounds not only does not retard the flow of the compound but apparently even assists it. When wood flour is used as the filler ordinarily about 50% resin to 50% wood flour must be employed to give a good fast flowing, rapidly curing compound. Obviously, a compound with such a high resin content is both uneconomical and generally unsuited for certain types of molded products. By using a protein such as gluten as the filler the amount of resin required in a compound may be reduced to 30% without unduly slowing up the rate of cure or reducing the flow. When for any reason it is desired to use both wood flour and proteins as fillers in a particular compound, the resin content may be as low as 25% and the wood flour as high as 40%.

The resins which have been found to be satisfactory for the compositions of the present invention are those which may be designated as heat-hardening phenolic or phenol-carbonyl resins. By the term "phenol-carbonyl resins" is meant resins prepared from either phenolic compounds and aldehydes or from phenolic compounds and ketones. As examples of the former type, there may be mentioned resins prepared from phenol, cresols, resorcinol, cresylic acid, and the like, in conjunction with such materials as formaldehyde paraformaldehyde, hexamethylenetetramine, acetaldehyde, furfural, and the like. These may be prepared with either acid or basic catalysts and may be either of the "one-step" or the "two-step" type, i. e., those resins which will cure without the addition of further reactive methylene compound and those which require an addition of such compound for the final cure. As examples of the phenol-ketone resins, there may be mentioned compositions prepared from phenol, cresols, resorcinol, cresylic acid, and the like, in conjunction with such materials as acetone, methyl ketone, diethyl ketone, and the like, and reactive methylene compounds such as formaldehyde, paraformaldehyde, hexamethylenetetramine, and the like. Of these latter resins, it is preferred to use those of the type prepared by the action of a reactive methylene compound upon a phenol-ketone intermediate condensation product such as diphenylol propane.

The protein materials which have been found to be suitable for the present invention are crude proteins free from large amounts of carbohydrate or fatty material. For example, corn gluten has been found to be eminently satisfactory if treated to remove the major part of the starch and to either remove or modify the oil content. The starch may be removed, for example, by malt saccharification followed by extraction with water and the oil may be removed by solvent extraction or modified by heat treatment. Casein is also very satisfactory for this purpose and either rennet or acid casein is satisfactory, although the former is preferred. Other protein materials of a like degree of purity may, of course, also be employed.

The process of the present invention comprises, essentially, mixing the resin and protein material with or without a reactive methylene compound, plastifying the mixture, and subsequently molding under heat and pressure. When it is desired to prepare molding compositions, the ratio of protein to resin is usually maintained below 3:1. In such cases there is sufficient resin present to plastify the protein without the addition of further agents to aid in this regard. However, as will be apparent to one skilled in the art, it will often be desirable to add modifying agents such as plasticizers, lubricants, pigments, dyes, or fillers such as wood flour. Also, if a two-step resin is employed, it will be necessary to add further reactive methylene compound. All of these materials may be added in the first stage of the process and a thorough mixing effected by any satisfactory means, as for example, in a ball mill. The resulting mixture is then plastified by any suitable method, but preferably by rolling in a rubber mill. The plastified product is then allowed to cool and is ground to yield a molding powder which may then be molded under heat and pressure according to known procedures.

As will be apparent to one skilled in the art, the time and temperature required for the plastifying and molding will depend upon the nature of the resin employed and the proportion of protein used. For example, if a quick-curing resin is used in conjunction with a low proportion of protein, a very short time will be required for both operations. Likewise, if a slow-curing resin and a high proportion of protein are employed, the time required for both operations will be much longer and an additional cure in the oven may sometimes be required. In general it may be said that the molding compositions may be plastified in one-half to two minutes at 100–120° C. and that a cure of a two inch disk may be effected in two to six minutes at 140–180° C.

The particular proportions of ingredients employed will depend upon the nature of the ingredients themselves and upon the nature of the final product desired. As has been previously pointed out, if a molding compound is desired, a lower proportion of protein will usually be employed, and in such cases other materials such as wood flour, asbestos, and the like may be used, if desired, to modify the characteristics of the molded product. The amount of reactive methylene compound employed will depend upon the nature of the resin used and upon the amount of protein present. For example, if a one-step resin is used, in certain cases there may be sufficient excess reactive methylene compound in the resin so that no further methylene compound need be added. However, if the resin contains no excess methylene compound or if a two-step resin is employed, it will be necessary to add from 1 to 10% of methylene compound, on the weight of the resin. In general, from 2 to 6% of the weight of the resin will be found to be satisfactory. In the case of molding compositions it is usually desirable to incorporate a somewhat higher proportion of the methylene compound than is employed in the case of the plastics for machining.

The products obtained by the process of the present invention are in all cases hard, tough plastics having good strength and elasticity and a satisfactory finish. As the protein content is increased the finish tends to dull slightly, but even in the case of the high protein content plastics the machined products may readily be given an excellent polish. These high protein plastics are in all cases sufficiently tough and elastic for machining and show no tendency to gum up the tool when it becomes hot. The molding compounds of the present invention have been found to have plasticity equal to or greater than that of compounds prepared from larger proportions of the same resin without proteins. For example, when determining plasticity by measuring the "fin" produced in a cup mold, a molding compound containing 45% of resin and 53% of wood flour was found to have a plasticity of 6.0 as compared to a plasticity of 4.5 for a compound containing 30% of resin, 33% of gluten, and 35% of wood flour.

The appearance of the products, of course, will depend upon the materials employed. If a light colored resin such as a diphenylol propane-formaldehyde resin and a light colored protein such as rennet casein are employed, the final product will be a light brown, translucent resin of pleasing appearance. The addition of white pigments to such compositions gives a light colored product which may readily be dyed according to known procedure. On the other hand, if dark colored resins and darker colored proteins such as gluten are employed, these products will not, as a rule, be suitable for dyeing with light shades but will be eminently satisfactory for black or other dark colored products.

The present invention may perhaps best be illustrated by the following specific examples:

*Example I*

The following materials were mixed together in a ball mill:

| | Parts |
|---|---|
| Resin (two-step heat-hardening phenol-formaldehyde) | 276 |
| Gluten | 318 |
| Wood flour | 330 |
| Hexamethylenetetramine | 44 |
| Lime | 5 |
| Montan wax | 4 |
| Zinc stearate | 3 |
| Dye | 20 |

After thorough mixing, the composition was milled for 90 seconds at 110° C., cooled, ground, and the powder molded at 160° C. and 2300 lbs. per sq. in. pressure for 2¼ minutes.

*Example II*

The following materials were mixed together in a ball mill:

| | Parts |
|---|---|
| Resin (one-step heat-hardening phenol-formaldehyde) | 288 |
| Gluten | 330 |
| Wood flour | 350 |
| Lime | 5 |
| Montan wax | 4 |
| Zinc stearate | 3 |
| Dye | 20 |

After thorough mixing, the composition was milled for 40 seconds at 110° C., cooled, ground, and the powder molded at 160° C. and 2300 lbs. per sq. in. pressure for 5 minutes.

*Example III*

The following materials were mixed together in a ball mill:

| | Parts |
|---|---|
| Resin (one-step heat-hardening phenol-formaldehyde) | 288 |
| Casein | 330 |
| Wood flour | 350 |
| Lime | 5 |
| Montan wax | 4 |
| Zinc stearate | 3 |
| Dye | 20 |

After thorough mixing, the composition was milled for 40 seconds at 110° C., cooled, ground, and the powder molded at 160° C. and 2300 lbs. per sq. in. pressure for 5 minutes.

*Example IV*

The following materials were mixed together in a ball mill:

| | Parts |
|---|---|
| Resin (heat-hardening diphenylolpropane-formaldehyde) | 288 |
| Gluten | 330 |
| Wood flour | 350 |
| Lime | 5 |
| Montan wax | 4 |
| Zinc stearate | 3 |
| Dye | 20 |

After thorough mixing, the composition was milled for 40 seconds at 110° C., cooled, ground, and the powder molded at 160° C. and 2300 lbs. per sq. in. pressure for 5 minutes.

It is to be understood, of course, that the above examples are illustrative only, and are not to be taken as limiting the invention to the particular compounds or proportions specified. For example, proteins other than gluten and casein may be employed, e. g., zein, gelatin, albumin, and the like. Also, resins other than phenol-formaldehyde and diphenylolpropane-formaldehyde resins may be used. As has been previously pointed out, any heat-hardening phenol-carbonyl resin is satisfactory for this purpose. Any of the known plasticizers, lubricants, pigments, and fillers may be employed instead of those specifically mentioned. The ratio of protein to resin may be varied from 0.5:1 to 3:1, depending upon the character of the other constituents of the molding compound and the character of final product desired. In general, it may be said that known equivalents and any modifications of procedure which would occur to one skilled in the art may be employed without departing from the scope of this invention.

The invention now having been described, what I claim is:

A molding composition comprising approximately 288 parts of a heat hardening phenol aldehyde resin, 330 parts of gluten and 350 parts of wood flour in 1000 parts of the composition.

KENNETH M. IREY.